2,223,079

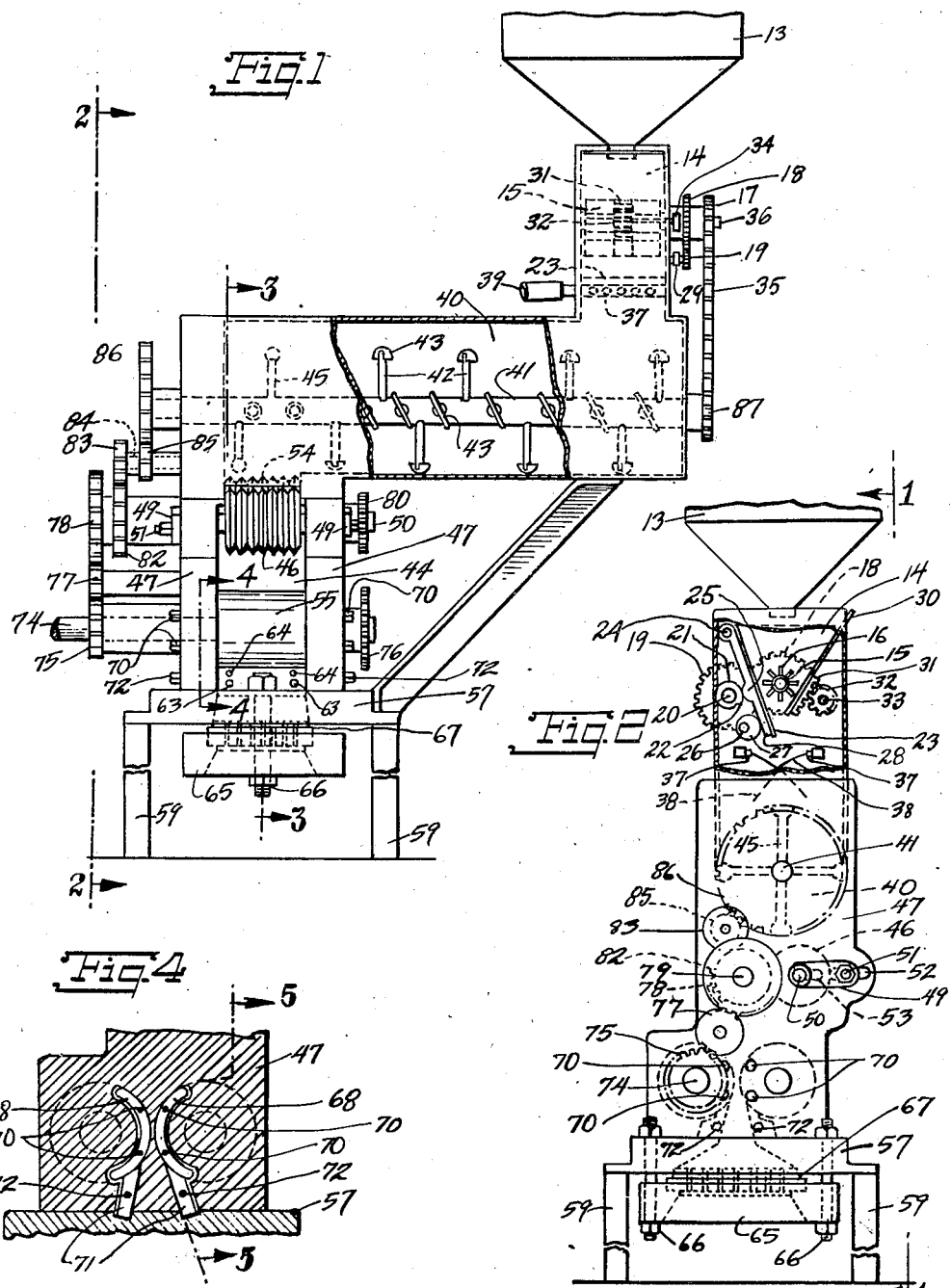
Nov. 26, 1940. C. SURICO 2,223,079
EXTRUSION PRESS AND PLASTIC SUBSTANCE COMPOUNDER THEREFOR
Filed May 24, 1939 2 Sheets-Sheet 1
INVENTOR
Carmine Surico
BY
Emanuel Scheyer
ATTORNEY Nov. 26, 1940.    C. SURICO    2,223,079
EXTRUSION PRESS AND PLASTIC SUBSTANCE COMPOUNDER THEREFOR
Filed May 24, 1939    2 Sheets-Sheet 2
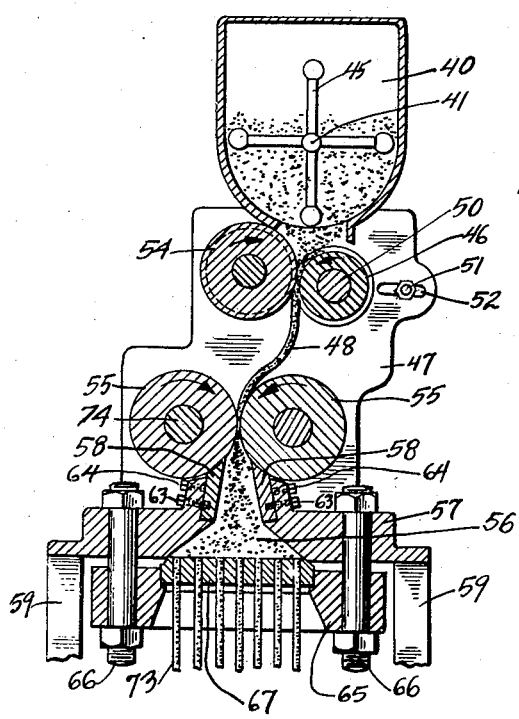
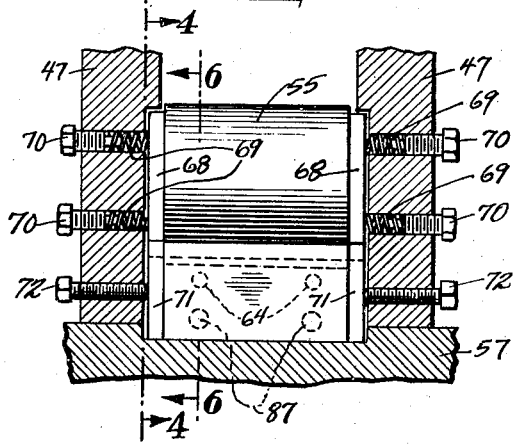
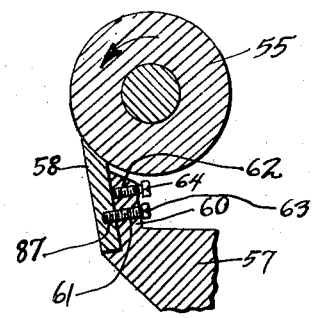
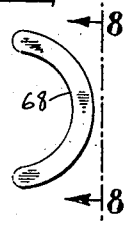
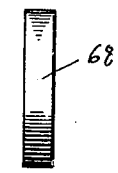
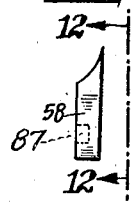
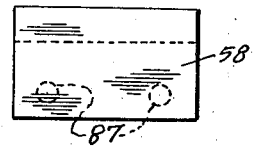
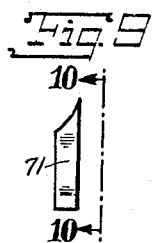
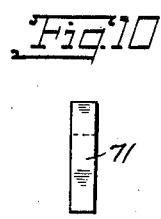
INVENTOR
Carmine Surico
BY
Emanuel Scheyer
ATTORNEY Patented Nov. 26, 1940

UNITED STATES PATENT OFFICE 2,223,079

EXTRUSION PRESS AND PLASTIC SUBSTANCE COMPOUNDER THEREFOR

Carmine Surico, Brooklyn, N. Y.

Application May 24, 1939, Serial No. 275,334

13 Claims. (Cl. 107—14)

This invention relates to a machine for making shaped products of a plastic substance such as alimentary paste, chocolate or unvulcanized rubber plasticized by a solvent. The machine is especially useful for making dough products such as noodles and macaroni. The machine, in one form, comprises two main parts, a part which compounds the ingredients into becoming the plastic substance, and the extrusion press which has a die for shaping the substance forced through it. In another form it comprises just the extrusion press itself, the compounded plastic substance being previously made elsewhere.

Machines of the prior art use a piston in a cylinder filled with the plastic material, the piston forcing the material through a die fastened across one end of the cylinder. Another type uses a feed screw instead of the piston in the cylinder, the rotation of the screw forcing the material out through the die. These machines require a large cylinder. Under the great pressure required to extrude the material, the large size of the cylinder is an inherent weakness which must be overcome by making it very heavy.

My machine comprises a pair of closely spaced rolls which seize the material fed to it and force it into a small chamber through a slot-shaped opening therein, the die being located preferably at the opposite end of the chamber from said opening. The distance between the slot and the die can be kept small. Even with the heavy pressures which must be used, a small chamber lends itself to relatively light walls or encasement means. It has also been found that the extruded material, where dough is used, is more dense and more uniform in its density than with the machines of the prior art. The largeness of the cylinder of the prior art, coupled with the method of forcing the material through the cylinder tend to give rise to less density and to interfere with its uniformity.

Other objects and advantages will become apparent upon further study of the description and drawings, in which:

Fig. 1 is a side elevation of the machine, a portion of the wall of the mixing chamber being broken away to show the paddles inside. A portion of the hopper is also omitted.

Fig. 2 is an end elevation looking along the line 2—2 of Fig. 1, a portion of the wall of the gravity feed chamber being broken away to show the agitating mechanism inside.

Fig. 3 is a partial section to an enlarged scale taken along the line 3—3 of Fig. 1.

Fig. 4 is a partial section to an enlarged scale taken along the line 4—4 of Figs. 1 and 5.

Fig. 5 is a partial section taken to a still greater scale along the line 5—5 of Fig. 4.

Fig. 6 is a partial section to the same scale as Fig. 5 and is taken along the line 6—6 of Fig. 5, showing only one force feed roll, scraper and a part of the support therefor.

Fig. 7 is a side view of a sealing member for a force feed roll.

Fig. 8 is an end view of the sealing member looking along the line 8—8 of Fig. 7.

Fig. 9 is an end view of the seal for a scraper.

Fig. 10 is a front view of the seal looking along the line 10—10 of Fig. 9.

Fig. 11 is an end view of a scraper, and

Fig. 12 is a front view of the scraper looking along the line 12—12 of Fig. 11.

The machine described in detail herein is one for making noodles or macaroni from dough and has mechanism for compounding the dough from its ingredients. It will be understood that the machine can be used for extruding plastic material other than dough. The dough mixer to be described is specific to dough, but it will be readily understood by those skilled in the art that other types of compounding mechanism and means for feeding the plastic material to the force rolls can be used to suit the particular plastic to be used.

The hopper 13 for holding the flour, discharges the flour into gravity feed chamber 14. The flour comes upon churner 15 which is rotatably mounted in the walls of gravity feed chamber 14. Churner 15 is provided with a plurality of radial paddles 16. Sprocket wheel 17 is fixed to shaft 36 of churner 15. Also fixed to the shaft of churner 15 is gear 18 which meshes with a gear 19 fixed to shaft 20. Also fixed to shaft 20 is a cam 21 having a tooth 22. A rocket plate 23 extends across gravity feed chamber 14. The upper end of plate 23 is loosely mounted on shaft 24. On the back of plate 23 is a rounded lug 25 extending from rib 28 which lug is engaged by cam 21. Mounted on a shaft 26 is an eccentric 27 limiting the downward swing of rib 28 and the plate 23 to which it is fastened. On the outer end of shaft 26 is an adjusting knob 29, Fig. 1. Oppositely inclined to rock plate 23 is slide plate 30. The upper end of slide plate 30 extends through a slot, not seen, in the wall of gravity feed chamber 14. To the back of plate 30 is fastened a rack 31 which engages a setting gear 32. Gear 32 is fixed to shaft 33, to the outer end of which is fixed knob 34. By turning knob 34, slide plate 30 may be raised or lowered, thereby controlling the distance between the lower end of said plate and the face of rock plate 23, for controlling the amount of flour falling down from gravity feed chamber 14.

The power for rotating sprocket 17 is obtained from chain 35 which in turn receives its power as will be explained later. The rotation of sprocket 17 turns shaft 36 rotating churner 15. At the same time shaft 20 is caused to rotate by gear 19, causing tooth 22 to engage lug 25 repeatedly thereby rocking rock plate 23. The agitation of churner 15 and rock plate 23 causes the flour to drop through the space between the bottom of slide plate 30 and the face of rock plate 23. By manually turning knob 29, eccentric 27 is caused to vary the stroke of rock plate 23. In the lower part of gravity feed chamber 14 are located two rows of water nozzles 37, the streams of water issuing therefrom being denoted by the numerals 38. Each row of nozzles is supplied by water through a hose, a part of one being shown at 39, Fig. 1. As the flour drops from gravity feed chamber 14 to mixing chamber 40 it is wet by streams 38. All the shafts noted above are mounted in the walls of the gravity feed chamber 14.

Extending longitudinally of mixing chamber 40, and mounted in the end walls thereof is paddle shaft 41. Extending radially from shaft 41, are arms 42, carrying inclined paddles 43. Mounted on the end of shaft 41 over chute 44, Fig. 1, leading to the extrusion press, are a number of beaters 45. The inclination of paddles 43 is such that as the dough is mixed it is also fed along toward the chute 44 end of mixing chamber 40, said chamber being long enough so that when the dough reaches its end, said dough is thoroughly mixed. Beaters 45 push and hammer the dough down to grooved feed rolls 46 and 54 rotatably mounted in walls 47 of the extrusion press at the top of chute 44. When the dough has passed down between feed rolls 46 and 54 it is in the form of a sheet 48. The thickness of sheet 48 is controlled by means of links 49, one on each wall 47, said links engaging the ends of shaft 50 carrying feed roll 46. Links 49, only one being shown in Fig. 2, are adjustable, being clamped in the position set, each by a bolt 51 which can be variously located in slot 52. The shifting of links 49, moves shaft 50 and with it roll 46 in slot 53.

As dough sheet 48 passes down from feed rolls 46 and 54, it is seized by force feed rolls 55, which latter are rotatably mounted in walls 47. Below rolls 55 is pressure chamber 56 formed mainly by walls 47, base plate 57 and scrapers 58 mounted on said plate. Walls 47 are mounted on base plate 57, which is in turn mounted on legs 59. Base plate 57 is provided with a pair of oppositely inclined lugs, one of which is shown at 60 in Fig. 6. Each lug 60 is provided with a lower pair of untapped holes 61, one of which is shown in Fig. 6 and an upper pair of tapped holes 62. Each scraper 58 is provided with a pair of tapped holes 87 in alignment with holes 61, so that each of said tapped holes in the scraper will engage the bottom of a bolt 63 for holding the scraper to the lug 60. In order to control the fit and pressure of the upper end of scraper 58 with the periphery of roll 55, a pair of bolts 64 are screwed into tapped holes 62. With bolts 63 loosened, the screwing in of bolts 64 will move the upper end of scraper 58 away from the roll 55. By manipulating bolts 63 and 64, the proper contact between scrapers 58 and rolls 55 can be obtained.

Die frame 65 is suspended from base plate 57 by means of two bolts 66, said frame being in the form substantially of a hollow rectangle. The upper portion of die frame 65 is recessed to receive the die 67. The upper edge of die 67 is beveled so that it can be tightly wedged up against the inclined sides of the die opening in base plate 57 when bolts 66 are screwed up tight.

In order to prevent leakage of dough from pressure chamber 56 past the ends of rolls 55, sealing members 68, Figs. 4, 5, 7 and 8 are used. If it were practicable to have the ends of rolls fit tight against the inside of walls 47 and still be able to rotate, the sealing members would not be required. Walls 47 are each provided with a somewhat crescent shaped depression in which is set a sealing member 68, Figs. 4 and 5. Each sealing member 68 is concentric with a roll 55, a member being held against each end of each roll by means of springs 69 and screws 70 set in tapped holes in walls 47. In order to complete the sealing, side sealing pieces 71 are used, one pressing against each end of the scrapers 58. The cross section of sealing pieces 71 is the same as that of scrapers 58, said pieces being set tight up against the outside of curved or crescent sealing members 68. Sealing pieces 71 are also set in recesses provided in walls 47, said recesses being contiguous to and below, Fig. 4, the recesses provided for sealing members 68. Each sealing piece 71 is set rigidly in its position by being pressed against by the end of a screw 72 set in a tapped hole in wall 47.

Force feed rolls 55 are set close enough together so that when rotated, the dough coming between them is seized and forced down into pressure chamber 56 and out through die 67 as product 73 in the shape or form predetermined by the die.

The power means for driving the machine, not shown, is connected to shaft 74. Fixedly mounted on said shaft is a gear 75, a force feed roll 55, and gear, not shown, on the far side of the press. The other roller 55 has a gear 76 which meshes with the gear on shaft 74 and is driven by the latter gear. Gear 75, carried by shaft 74, meshes with an idler gear 77, Figs. 1 and 2, which in turn engages gear 78 fixed to shaft 79. Feed roll 54 is also fixed to shaft 79. A gear, not seen, is fixed to the far end of shaft 79, which gear meshes with a gear 80 fixed to the shaft 50 of feed roll 46. Fixed to shaft 79, just in back of gear 78 is a gear 82. Gear 82 engages idler gear 83 fixed to short shaft 84. Gear 85 is also fixed to short shaft 84 and meshes with gear 86 fixed to paddle shaft 41. The far end of paddle shaft 41 carries a sprocket wheel 87 engaging chain 35 which drives sprocket wheel 17.

The train of gears, sprocket wheels and chain just described drive the force feed rolls 55, the grooved feed rolls 46 and 54, the paddle shaft 41 and the agitating mechanism 15 and 23.

I claim:

1. An extrusion press for plastic material comprising encasement means forming a pressure chamber having a feed opening and a discharge opening, a pair of rolls at the feed opening, a die extending across the discharge opening, said die shaping the material passing through it, means for feeding plastic material to said rolls, the latter seizing the material between them and forcibly feeding it into said chamber and out through the die, a sealing piece movably mounted on the encasement means at each end of each roll, said pieces being adapted to move axially of the rolls, and spring means pressing the sealing pieces axially against the ends of the rolls cutting off substantial leakage of material between the ends of the rolls and the encasement means.

2. An extrusion press for plastic material comprising encasement means forming a pressure chamber having a feed opening and a discharge opening, a pair of rolls at the feed opening, a die extending across the discharge opening, said die shaping the material passing through it, means for feeding plastic material to said rolls, the latter seizing the material between them and forcibly feeding it into said chamber and out through the die, scraping members at opposite sides of the feed opening slidably contacting the rolls for scraping off into the chamber the material adhering to the rolls, a sealing piece movably mounted on the encasement means at each end of each roll, said pieces being adapted to move axially of the rolls, spring means pressing the sealing pieces axially against the ends of the rolls, cutting off substantial leakage of material between the ends of the rolls and the encasement means, and a pair of sealing blocks between the ends of each scraping member and the encasement means, a block being held against each end of each scraping means, the upper end of each block being held against a sealing piece, the sealing blocks preventing substantial leakage past the scraping members.

3. An extrusion press for plastic material comprising encasement means forming a pressure chamber, a pair of extrusion rolls extending across one part of said chamber, a die for shaping the material passing through it, said die extending across another part of said chamber, means for forming material fed to it into a sheet, said extrusion rolls when rotated seizing the sheet between them and filling said chamber with dough under pressure, forcing the dough thereby out through the die and mechanism for actuating the sheet forming means and rotating the extrusion rolls in a predetermined relation suitable for feeding the material to the rolls in accordance with their capacity for seizing the material.

4. An extrusion press for plastic material comprising encasement means forming a pressure chamber, a pair of extrusion rolls extending across one part of said chamber, a die for shaping the material passing through it, said die extending across another part of said chamber, means for forming material fed to it into a sheet, said sheet being thicker than the space between the extrusion rolls, said rolls when rotated seizing the sheet between them and filling said chamber with dough under pressure, forcing the dough thereby out through the die and mechanism for actuating the sheet forming means and rotating the extrusion rolls in a predetermined relation suitable for feeding the material to the rolls in accordance with their capacity for seizing the material.

5. An extrusion press for plastic material comprising encasement means forming a pressure chamber, a pair of extrusion rolls extending across one part of said chamber, a die for shaping the material passing through it, said die extending across another part of said chamber, a pair of feed rolls for forming material fed to them into a sheet, said extrusion rolls when rotated seizing the sheet between them and filling said chamber with dough under pressure, forcing the dough thereby out through the die mechanism for rotating the feed rolls and the extrusion rolls in a predetermined relation suitable for feeding the material to the rolls in accordance with their capacity for seizing the material, said feed rolls being of sufficient length to produce a sheet as wide as the part of the chamber extended over by the extrusion rolls.

6. An extrusion press for plastic material comprising encasement means forming a pressure chamber having a feed opening and a discharge opening, a pair of rolls at the feed opening, a die extending across the discharge opening, said die shaping the material passing through it, means for feeding plastic material to said rolls, the latter seizing the material between them and forcibly feeding it into said chamber and out through the die, adjustably mounted scraping members at opposite sides of the feed opening slidably contacting the rolls for scraping off into the chamber the material adhering to the rolls, means for adjustably setting the contact of said members with the rolls, and a pair of sealing blocks between the ends of each scraping member and the encasement means, said blocks being mounted to move axially of the rolls and means for each block for holding the block against an end of the scraping member, the sealing blocks when loose permitting adjustment of the scraping members.

7. An extrusion press as claimed in claim 6 in which the sealing blocks are set in recesses provided in the encasement means opposite the ends of the scraping means.

8. An extrusion press as claimed in claim 1 in which the sealing pieces are set in recesses provided in the encasement means opposite the ends of the rolls.

9. An extrusion press for plastic material comprising encasement means forming a pressure chamber having a feed opening and a discharge opening, said encasement means having portions extending beyond the pressure chamber, a pair of rolls at the feed opening, said rolls extending between the portions of the encasement means beyond the chamber, the length of the rolls being less than the distance between said portions opposite the rolls, a die extending across the discharge opening, said die shaping the material passing through it, means for feeding plastic material to the rolls, the latter seizing the material between them and forcibly feeding it into said chamber and out through the die, a sealing piece at each end of each roll, movably mounted between the encasement means and a roll, said pieces being adapted to move axially of the rolls, and means for yieldingly maintaining the sealing pieces against the ends of the rolls, cutting off substantial leakage of material between the ends of the rolls and the encasement means and at the same time allowing the rolls to rotate.

10. An extrusion press for plastic material comprising encasement means forming a pressure chamber having a feed opening and a discharge opening, said encasement means having portions extending beyond the pressure chamber, a pair of rolls at the feed opening, a die extending across the discharge opening, said die shaping the material passing through it, means for feeding plastic material to the rolls, the latter seizing the material between them and forcibly feeding it into said chamber and out through the die, adjustably mounted scraping members at opposite sides of the feed opening slidably contacting the rolls for scraping off into the chamber the material adhering to the rolls, said scraping members extending between the portions of the encasement means beyond the chamber, the length of said members being less than the distance between said portions opposite said members, a sealing block at each end of each member between the encasement means and a member, means for removably holding the block against an end of a member, the sealing blocks when loose permitting adjustment of the scraping members.

11. An extrusion press for plastic material as claimed in claim 5 having a mounting for at least one of the feeding rolls permitting it to be moved to and from the other roll for varying the thickness of the sheet of material reaching the extrusion rolls and means for releasably fastening the movable roll in the position set.

12. An extrusion press for plastic material comprising encasement means forming a pressure chamber, a pair of extrusion rolls extending across one part of said chamber, a die for shaping the material passing through it, said die extending across another part of said chamber, means for feeding plastic material to the rolls, said rolls when rotated seizing the material between them and filling said chamber with dough under pressure, forcing the dough thereby out through the die, and yieldably set means between the rolls and the encasement means for sealing the rolls to the encasement means whereby leakage of dough from said chamber past the rolls is substantially prevented.

13. An extrusion press for plastic material comprising encasement means forming a pressure chamber having a feed opening and a discharge opening, a pair of rolls at the feed opening, a die extending across the discharge opening, said die shaping the material passing through it, means for feeding plastic material to said rolls, the latter seizing the material between them and forcibly feeding it into said chamber and out through the die, adjustably mounted scraping members at opposite sides of the feed opening slidably contacting the rolls for scraping off into the chamber the material adhering to the rolls, means for adjustably setting the contact of said members with the rolls and releasably set means for sealing said members substantially at their ends to the encasement means.

CARMINE SURICO.